United States Patent [19]

Fenerty et al.

[11] 3,926,443
[45] Dec. 16, 1975

[54] COMPOSITE SEAL RING AND ASSEMBLY

[75] Inventors: Michael J. Fenerty, Boulder; David L. Mustoe, Wheatridge, both of Colo.

[73] Assignee: Coors Porcelain Company, Golden, Colo.

[22] Filed: Mar. 5, 1974

[21] Appl. No.: 448,328

[52] U.S. Cl. .................................. 277/96; 277/85
[51] Int. Cl.² ........................................ F16J 15/34
[58] Field of Search .......... 277/96 A, 96 R, 85, 231, 277/227; 161/182, 168

[56] References Cited
UNITED STATES PATENTS

| | | | |
|---|---|---|---|
| 2,100,220 | 11/1937 | King | 277/96 A |
| 2,853,323 | 9/1958 | Engelking et al. | 277/96 A |
| 3,108,816 | 10/1963 | Moore | 277/96 R |

*Primary Examiner*—Samuel B. Rothberg
*Attorney, Agent, or Firm*—Reising, Ethington, Barnard, Perry and Brooks

[57] ABSTRACT

In accordance with the invention there is provided a seal ring assembly comprising a pair of seal rings having axial end faces in abutting slidable engagement with each other, each of the end faces being formed at least in part of alumina ceramic or magnesia-alumina spinel and at least one of the end faces being formed in part of organic resin, amorphous carbon, graphite, or mixtures thereof.

7 Claims, 5 Drawing Figures

COMPOSITE SEAL RING AND ASSEMBLY

This invention relates to bearing and sealing assemblies for relatively rotatable members. It has particular utility as a face type seal assembly for preventing leakage of fluid along a rotating shaft where it extends through the wall of a housing, and hence will be described in conjunction therewith.

A typical application of the invention as a face seal assembly for rotary shafts is in automotive engine water pumps wherein sealing against water leakage is effected by two abutting ring members encircling the shaft, one of the rings being rotatably driven by the shaft and the other held stationary in the pump housing. Various materials have heretofore been used for the rings, for example metals, carbon, organic resins and alumina ceramic. The difficulty, however, has always been that where a hard wear-resistant material like alumina ceramic is used there is a friction problem and where a softer material such as organic resin is used there is a wear problem. Of course, when there is a friction problem then there is serious disadvantage not only because of the loss in mechanical efficiency but also because the friction itself increases the wear and hazard of other damage to the rings because of the heat generated.

It is known to use an assembly wherein one of the rings is of hard and wear-resistant alumina ceramic and the other ring is of a relatively soft material such as carbon or organic resin so as to reduce friction. However, this is not a full solution since there remains the wear problem as regards the relatively soft ring. It has been proposed to make both rings of porous hard material and then supply oil to the abutting ring faces through the pores in order to reduce friction. The difficulty with this is that with increased porosity there is decreased wear resistance and hence where the hard material is made porous to provide for lubrication, the gain in wear resistance by reason of lower friction is set off by the loss in wear resistance because of the porosity. What is really required to solve the problem is an assembly wherein both rings present faces of a hard dense wear-resistance material and yet without there being a friction problem. The present invention fulfills this need.

It is, therefore, a principal object of the invention to provide a face type seal for rotary shafts which not only has low friction drag characteristics, but which also has high resistance to wear.

Briefly, this is accomplished in accordance with the invention by a face type seal wherein the abutting faces of both the rotating and stationary seal rings are formed at least in part of very hard wear-resistant ceramic and wherein the face of at least one of the rings is formed in part of softer material providing low friction characteristics. Other objects, features and advantages of the invention will appear more clearly from the following detailed description of preferred embodiments thereof made with reference to the drawings wherein.

Figure 1:
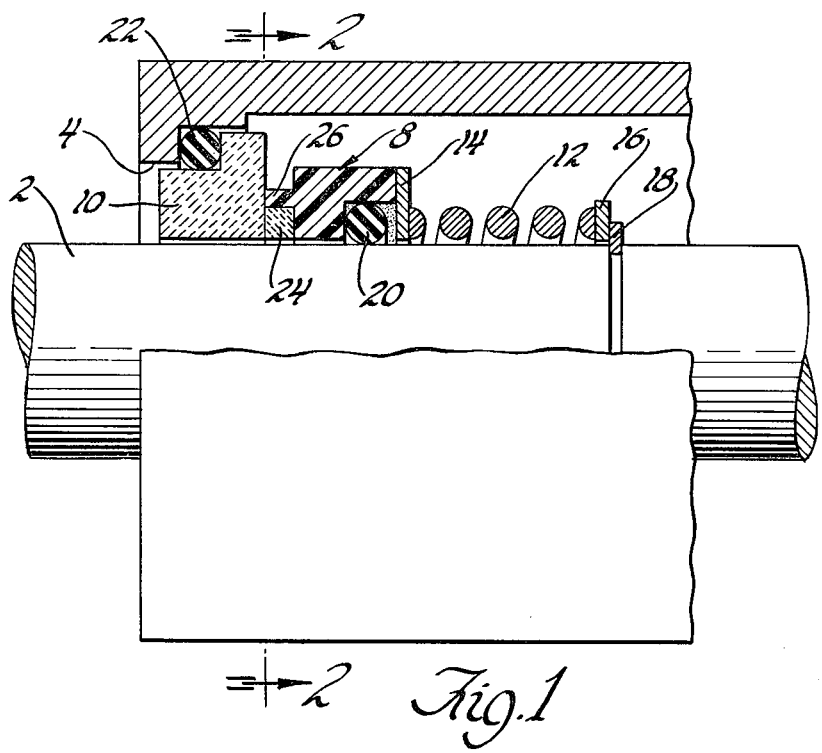
FIG. 1 is a longitudinal sectional view through a portion of an automotive engine water pump showing the invention in the form of a face type seal installed between the rotary shaft of the pump and an end wall of the pump housing.

Referring now to FIG. 1, there is shown a portion of an automotive engine water pump having a rotating shaft 2 extending through an opening 4 in an end wall of the housing of the pump. To prevent leakage of water along the rotating shaft through the opening 4, there is provided a face type seal comprising two axially aligned abutting rings 8 and 10, the latter of which remains stationary with the housing and the former of which rotates with the shaft and hence is in relatively rotatable sliding engagement with the stationary ring. To assure continued abutting relationship between the two rings, spring pressure is applied to the ring 8 by a spring 12 biased between washer 14, which abuts seal ring 8, and washer 16 which is keyed to the shaft 2 by a snap ring 18. A rubber O-ring 20 provides a seal between ring 8 and the shaft, and rubber O-ring 22 provides a seal between ring 10 and the housing.

Figure 2:
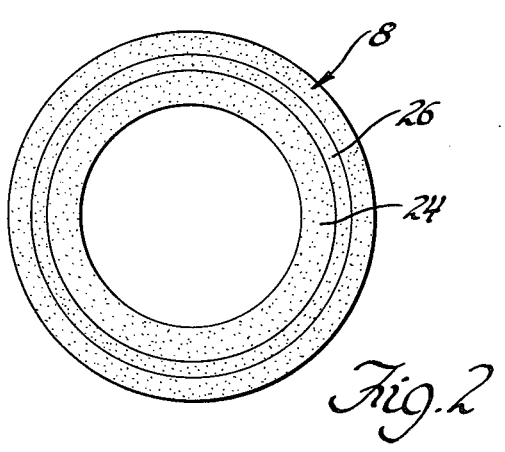
FIG. 2 is an end view of one of the seal rings of the seal shown in FIG. 1.

In the embodiment shown in FIGS. 1 and 2 the seal ring 8 is a molded body of organic resin having, at the seal face end thereof, an alumina ceramic ring 24 imbedded therein and bonded thereto. Hence, the seal face of the ring 8 which is in abutting relationship with the seal face of ring 10 has an inner continuous portion formed of the alumina ceramic surrounded by an outer continuous portion 26 formed of the organic resin. In the FIG. 1–2 embodiment, seal ring 10 is formed entirely of alumina ceramic. The alumina ceramic of ring 10, and of ring 24 which forms the insert for seal ring 8, is of sintered structure, and is sintered to high density, preferably at least 80% of theoretical density, and hence is substantially non-porous. Such ceramic is extremely hard and wear resistant, the hardness being upwards of 7 on the Mohs scale.

In operation, the high hardness and wear resistance of the abutting faces of ring 10 and insert ring 24 prevent rapid wear to the seal rings, and the abutting relationship between ring 10 and the organic resin outer portion 26 of the seal face of ring 8 causes minute portions of the organic resin to be rubbed from the organic resin portion of the seal face, which portions, it has been found in practice, migrate radially inwardly between the abutting alumina ceramic face portions thereby providing lubricity and substantially reducing the friction between the alumina ceramic face portions as they slidably rotate with respect to each other. The result is an extremely long life and durable face seal, the alumina ceramic face portions providing the high wear resistance and the organic resin face portion providing a continued supply of sufficient organic resin between the contacting alumina ceramic face portions to assure the required low friction characteristics between these seal face portions.

Though in the embodiment shown in FIG. 1, seal ring 10 is formed entirely of alumina ceramic, it is fully within the scope of the invention to use for the seal ring 10 a structure which provides a seal face the same or similar to that of ring 8. That is, if desired ring 10 can be formed of a body of organic resin having an alumina ceramic ring imbedded therein and bonded thereto at the seal face end thereof and axially aligned with alumina ceramic ring 24 of seal ring 8.

As has been alluded to above the alumina ceramic has a hardness of greater than 7 on the Mohs scale. By the term "alumina ceramic" is meant a sintered ceramic containing at least about 85% by weight aluminum oxide and any remainder being fluxing ingredients, glass-formers or crystal growth inhibitors. Such ceramics are well-known in the art, two illustrative patents teaching such ceramics being U.S. Pat. No. 2,272,618 and U.S. Pat. No. 3,377,176. Typical compositions are as follows, all percentages being by weight: 100% aluminum oxide; 98% aluminum oxide, 2% magnesium oxide; 90% aluminum oxide, 6% silica, 4% calcium oxide; 85% aluminum oxide, 10% silica, 5% magnesium oxide. As has also been mentioned above, it is much preferred that in firing the alumina ceramic it be sintered to a density of at least about 80% of theoretical. In other words, if the theoretical highest density for the ceramic is 4 grams per cubic centimeter (as is the case for 100% aluminum oxide), then the density of the alumina ceramic should be at least 3.2 grams per cubic centimeters. At such a density, the alumina ceramic is substantially non-porous to the end that it is impermeable. The high density increases its wear resistance. Further, for maximum mechanical strength and wear resistance it is preferred that the alumina crystals in the sintered alumina ceramic have an average size not exceeding 20 microns. In general, the higher the alumina content of the alumina ceramic the higher the density and hence it is preferred that the alumina ceramic contain at least about 85% by weight aluminum oxide.

Whereas alumina ceramic is preferred for the practice of the invention, another ceramic which can be used to advantage is sintered magnesia-alumina spinel which, like alumina ceramic, has a hardness of greater than 7 on the Mohs scale. Here again, it is preferred that the density of the spinel be at least 80% of theoretical or at least 2.9 grams per cubic centimeter. If desired the ceramic of one ring can be alumina ceramic and that of the other ring magnesia-alumina spinel.

The organic resin used for the organic resin portion of the ring or rings should preferably be a thermosetting resin such as phenol formaldehyde, urea formaldehyde or epoxy resin. Of course, the resin can contain fillers if desired. Other materials which can be used in place of organic resin as the relatively soft or non-ceramic portion of the ring or rings are graphite, amorphous carbon, e.g. carbon black, and mixtures of these with each other or with organic resin — for example, organic resin bonded amorphous carbon or graphite.

Figure 3:
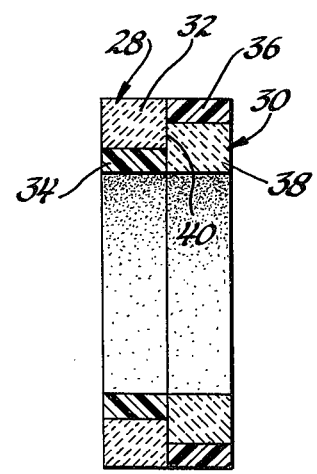
FIG. 3 is a cross-sectional view of a pair of seal rings illustrating another embodiment of the invention.

Turning now to FIG. 3 there is shown another embodiment of the invention comprising the pair of axially aligned seal rings 28 and 30 in face-to-face abutting sliding relationship. In ring 28 the outer annular portion 32 is of alumina ceramic, or magnesia alumina spinel, and the inner annular portion 34 is of organic resin, graphite or amorphous carbon or a mixture thereof. in ring 30 the outer annular portion 36 is of organic resin, graphite or amorphous carbon or a mixture thereof and the inner annular portion 38 is of alumina ceramic or magnesia alumina spinel. Hence, in this embodiment each of the contacting rings has a face with a continuous organic resin (or carbon or graphite) portion which surrounds the center of the face. The radial thickness of the ceramic rings 32 and 38 are such that there is ceramic-to-ceramic contact at a center portion 40 of the radial thicknesses of rings 28 and 30. Hence, lubricity is provided by the sliding contact between ring portions 36 and 32 and between ring portions 34 and 38, and the relatively soft material rubbed from ring portions 34 and 36 migrates sufficiently onto the contacting ceramic faces 40 to provide the needed low friction characteristics.

Figure 4:
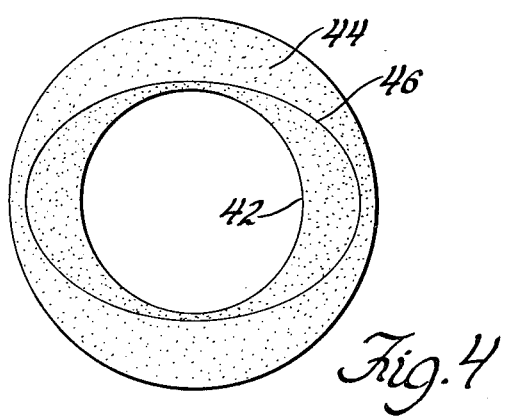
FIG. 4 is an end view of a seal ring illustrating still another embodiment of the invention.

In FIG. 4, the seal ring shown comprises an inner alumina ceramic or magnesia alumina spinel portion 42 and an outer portion 44 of organic resin, graphite or amorphous carbon or a mixture thereof. The ceramic portion 42 has a periphery 46 which is oval shaped and hence which is not parallel throughout to the circular inner and outer edges of the rings. Hence, as the ring rotates, either against an identical ring or against a ring formed entirely of the ceramic, or a ring of other structure embodying the invention, the relatively soft lubricative portion 44 rubs directly against portions of the other ring which, during each revolution, rub against the ceramic portion 42. This assists in distributing the relatively soft lubricative material over the contacting ceramic face portion.

Figure 5:
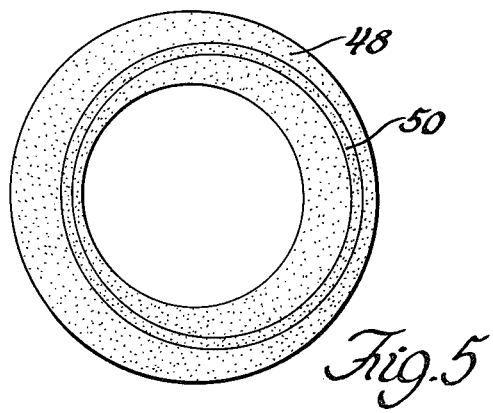
FIG. 5 is an end view of a seal ring illustrating still another embodiment of the invention.

FIG. 5 shows a seal ring 48 formed of alumina ceramic or magnesia alumina spinel and having a circular groove formed in the seal face thereof, this circular groove being filled with organic resin, graphite, amorphous carbon or a mixture thereof, thereby providing an eccentric ring insert 50 of the relatively soft lubricative material in the seal face of the ring 48. The eccentricity of the insert ring 50 with respect to the ring 48 assists in distributing the relatively soft lubricative material of the insert ring over the contacting ceramic face portions of the seal rings, it being understood that here again, as in the case of the FIG. 4 embodiment, the ring 48 can be run against a ring of identical structure or against a ring formed entirely of alumina ceramic or magnesia alumina spinel, or against a ring of other structure in accordance with the invention.

To manufacture the seal rings in accordance with the invention the ceramic portion of the ring can be supported in a suitable mold and the remaining portion of the ring can then be molded against and around or into, as the case may be, the ceramic portion. Alternatively, though generally at the disadvantage of greater manufacturing expense, the organic resin or other soft portion of the ring can be made separately and then bonded to the ceramic portion as by the use of epoxy resin. Irrespective of the precise technique for manufacture, where, as is preferred, the soft portion of the ring is or contains organic resin, and where it is desired to obtain greater bond strength with the ceramic portion, the invention covered by U.S. Pat. No. 3,607,607 or that covered by U.S. Pat. No. 3,666,613 can be used to advantage. Briefly, what these patents cover are ceramic-organic resin composites, and methods for making same, wherein the ceramic is provided with a metallized surface to which the resin is bonded thereby to attain increased bond strength between the ceramic and the organic resin.

Particularly where the seal rings are required to be of relatively complicated shape, the invention has an added advantage in that it can substantially reduce manufacturing costs. Seal ring 8 shown in FIG. 1 serves as an example. If the seal ring 8 were to be made entirely of ceramic there could be manufacturing difficulties, with attendant expense, since as is well known in the industrial ceramics art, the manufacture of complex ceramic shape introduces problems where manufacture is to be by simple dry pressing followed by a firing operation. That is, where the shape being dry pressed is complex there can be problems in attaining the uniform density required in the dry pressed part in order to assure against distortion during firing. Other methods of manufacture are generally more costly than dry pressing. With the present invention only the very simple flat ring 24 need be made of the ceramic and the molding of the remainder of the ring 8, i.e. the portion formed of organic resin, can be accomplished simply and at low cost.

Other changes and modifications can be made within the full and intended scope of the claims which follow.

The embodiments of the invention in which an exclusive property or privilege is claimed are defined as follows:

1. A seal ring assembly comprising a pair of seal rings having axial end faces in abutting slidable engagement with each other, each of said end faces being formed at least in part of substantially non-porous hard ceramic material selected from the group consisting of alumina ceramic and magnesia-alumina spinel and at least one of said end faces being formed in part of a softer solid material selected from the group consisting of the organic resins, amorphous carbon, graphite, and mixtures thereof, the hard ceramic of one axial end face being in continuous contact with the hard ceramic and with the softer solid material of the other axial end face.

2. A seal ring assembly as set forth in claim 1 wherein said first mentioned material has a density of at least 80% of theoretical.

3. A seal ring assembly as set forth in claim 1 wherein said first mentioned material is alumina ceramic.

4. A seal ring assembly as set forth in claim 1 wherein the portion of the end surface formed of said first mentioned material is a continuous portion enclosing the center of the face.

5. A seal ring assembly as set forth in claim 4 wherein said continuous portion is circular.

6. A seal ring assembly as set forth in claim 4 wherein said continuous portion is concentric with the center of the face.

7. An assembly comprising a rotating shaft, a housing having an opening therethrough encircling the shaft, and a face seal for preventing leakage of fluid between said shaft and housing opening, said seal comprising two axially adjacent rings encircling the shaft adjacent said opening, each of said rings having an annular end face, each said face rotably bearing against the face of the other ring, one of said rings being connected to the shaft for rotation therewith and the other of said rings being held against rotation by the housing, the face of each of said rings being formed at least in part of substantially non-porous hard ceramic material selected from the group consisting of alumina ceramic and magnesia-alumina spinel and at least one of said faces being formed in part of a softer solid material selected from the group consisting of the organic resins, amorphous carbon, graphite and mixtures thereof, the hard ceramic of one end face being in continuous contact with the hard ceramic and with the softer solid material of the other end face.

* * * * *